United States Patent
Spindler et al.

(10) Patent No.: US 10,234,851 B2
(45) Date of Patent: Mar. 19, 2019

(54) METHOD FOR THE CONTROLLED CHANGEOVER OF A TREATMENT MACHINE

(71) Applicant: KRONES AG, Neutraubling (DE)

(72) Inventors: Herbert Spindler, Niedermoosen (DE); Juergen Werner, Bruckmühl (DE); Peter Koch, Brannenburg (DE)

(73) Assignee: KRONES AG, Neutraubling (DE)

( * ) Notice: Subject to any disclaimer, the term of this patent is extended or adjusted under 35 U.S.C. 154(b) by 254 days.

(21) Appl. No.: 14/913,510

(22) PCT Filed: Jul. 25, 2014

(86) PCT No.: PCT/EP2014/066038
§ 371 (c)(1),
(2) Date: Feb. 22, 2016

(87) PCT Pub. No.: WO2015/036158
PCT Pub. Date: Mar. 19, 2015

(65) Prior Publication Data
US 2016/0209832 A1      Jul. 21, 2016

(30) Foreign Application Priority Data

Sep. 10, 2013 (DE) .......................... 10 2013 218 020

(51) Int. Cl.
| | | |
|---|---|---|
| *B65B 59/04* | (2006.01) | |
| *G06F 19/00* | (2018.01) | |
| *G01S 1/68* | (2006.01) | |
| *G01S 13/87* | (2006.01) | |
| *G05B 19/4063* | (2006.01) | |
| *G05B 15/02* | (2006.01) | |
| *G05B 19/418* | (2006.01) | |

(52) U.S. Cl.
CPC .................... *G05B 19/4183* (2013.01); *G05B 2219/31304* (2013.01); *G05B 2219/32064* (2013.01);
(Continued)

(58) Field of Classification Search
CPC . G05B 19/41815; B65B 59/04; B65B 65/003; B65B 21/24
See application file for complete search history.

(56) References Cited

U.S. PATENT DOCUMENTS

| | | | | |
|---|---|---|---|---|
| 2004/0015418 A1* | 1/2004 | Dooley | .................. | G06Q 10/06 705/28 |
| 2006/0179758 A1* | 8/2006 | Zuccheri | ................. | B65B 59/04 52/474 |

(Continued)

FOREIGN PATENT DOCUMENTS

| | | |
|---|---|---|
| CN | 101117019 A | 2/2008 |
| CN | 102030120 A | 4/2011 |

(Continued)

OTHER PUBLICATIONS

Notification of First Office Action, The State Intellectual Property Office of P.R. China, Application No. 201480049052.6, dated Apr. 13, 2017.

(Continued)

*Primary Examiner* — Brian Turner
(74) *Attorney, Agent, or Firm* — Marshall, Gerstein & Borun LLP

(57) ABSTRACT

Method for controlled changeover of a container treatment machine having a plurality of RFID reading devices, a control unit and one or more treatment modules, every treatment module having a plurality of remote indicators, and one or more exchangeable handling parts equipped with RFID transponders for unambiguous identification, including displaying, via the remote indicators, predetermined target identifiers for the handling parts which are transmitted by the control unit; displaying, via the remote indicators, actual identifiers for the handling parts that are retrieved from the RFID transponders via the RFID reading devices; comparing respective actual identifiers for the handling parts (Continued)

with respective target identifiers therefor, and signaling when a change of the handling part is required if the actual identifier deviates from the respective target identifier, or signaling that a handling part is correctly used if the actual identifier corresponds to the respective target identifier.

28 Claims, 2 Drawing Sheets

(52) U.S. Cl.
CPC .............. *Y02P 90/04* (2015.11); *Y02P 90/10* (2015.11); *Y02P 90/86* (2015.11)

(56) References Cited

U.S. PATENT DOCUMENTS

| | | | |
|---|---|---|---|
| 2009/0213420 A1 | 8/2009 | Dirsch et al. | |
| 2011/0078979 A1* | 4/2011 | Hutter | G05B 19/41815 |
| | | | 53/201 |
| 2012/0075079 A1 | 3/2012 | Takagi et al. | |

FOREIGN PATENT DOCUMENTS

| | | |
|---|---|---|
| DE | 102005059312 A1 | 6/2007 |
| DE | 102009044163 A1 | 4/2011 |
| DE | 102011054890 A1 | 5/2013 |
| EP | 2239374 A1 | 10/2010 |
| WO | WO-2008022708 A1 | 2/2008 |
| WO | WO-2008145345 A1 | 12/2008 |
| WO | WO-2009013084 A1 | 1/2009 |
| WO | WO-2011104036 | 5/2011 |

OTHER PUBLICATIONS

Search Report for application DE 10 2013 218 020.9, dated May 19, 2014.

International Search Report for application No. PCT/EP2014/066038, dated Apr. 9, 2015.

* cited by examiner

METHOD FOR THE CONTROLLED CHANGEOVER OF A TREATMENT MACHINE

CROSS-REFERENCE TO RELATED APPLICATION

The present application is the United States national phase of International Patent Application No. PCT/EP2014/066038, filed Jul. 25, 2014, which application claims to German Application No. 102013218020.9, filed Sep. 10, 2013. The priority application is hereby incorporated by reference.

FIELD OF THE DISCLOSURE

The disclosure relates to a method for the controlled changeover of a treatment machine, such as for treating containers in bottling and canning operations.

BACKGROUND OF THE DISCLOSURE

Treatment machines, in particular treatment machines for treating containers such as bottles, cans or similar receptacles are frequently constructed in a modular manner. Depending on the type of container they may include, for example, a stretch blow module (for PET bottles) and/or a filler module and/or a labeling module and/or a packaging module. A similar modular structure is possible in cleaning machines for cleaning containers such as bottles. Each module usually performs a special treatment of the containers, such as stretch-blow molding, filling, labeling, etc.

Treatment machines or the modules thereof can be adjusted to the treatment of a specific type of container. If a type of container is changed, the entire treatment machine, or at least some of its modules, is readjusted. To do this, in addition to parameters such as throughput rates, rotation rates, filling levels etc. static parameters such as widths, lengths, heights and angles may also be adjusted. For example, transport tracks, guide rails, cutting equipment, spreaders can be adjusted so that they fit optimally to the specific sizes and requirements of the containers to be treated. The treatment machine is often adjusted at selected points of adjustment, i.e. reset or readjusted. Adjustment points can be adjusted by means of linear motors or spindle motors or even manually. There may be a specific set of parameters for a specific treatment of a specific type of container. To changeover/switch to another container, another set of parameters is used. Such a changeover can be controlled electronically. In particular, one or more control units can be used to indicate the order of changeover and to monitor the desired and the actual values for the adjustment points. The desired and the actual values can be displayed digitally.

Apart from the aforementioned parameter sets, various operating elements and/or treatment elements and/or treatment parts for the containers may be used. These operating or treatment elements can be adapted to the specific situation of treatment, i.e. the containers to be treated. The operating or treatment elements are hereinafter generally referred to as change parts or handling parts. A partial list of examples of such elements includes graduation bars, filling valves, label grippers, star-shaped feed devices, with many more being available. It is understood that these change parts/handling parts are often changed in addition to the parameter sets already mentioned above. In some cases, the parameter sets will entail exchanging a change part. Another possibility of exchanging a handling part is part of an exchange in terms of maintenance.

When a handling part is subject to wear it must be maintained or even completely replaced. Cyclic exchanges are also possible. The identification of such handling parts is often due to numbers or color codes. Changeover/exchanging/replacing of handling parts/change parts is not coupled to the electronic changeover of the parameters it is virtually done at the same time or in addition. Although the identification numbers of the handling parts required for the changeover of handling parts can, indeed, be displayed on a display in order to select a correct new handling part. After loading, however, the process must be completed manually. Loading/removing/exchanging the handling part must be acknowledged, e.g. manually, after the handling part has been inserted. Then, the next handling part can be inserted/replaced. This can lead to changeover errors. In particular, wrong handling parts can be inserted. The user may nevertheless inadvertently acknowledge the loading as "correct." The set-up and changeover times, e.g. for changing the treatment machine in order to treat a new, different container are extended by such errors, which may reduce the efficiency of the operation of the plant.

SUMMARY OF THE DISCLOSURE

In view of the problems described above, it is one aspect of the present disclosure to provide an integrated approach for minimizing or even excluding the above-mentioned error sources and thus increasing the efficiency of the system.

The disclosure provides a method for the controlled changeover of a treatment machine, in particular a container treatment machine which comprises a plurality of RFID reading devices, a control unit and one or more treatment modules, each treatment module comprising a plurality of remote indicators and one or more exchangeable handling parts equipped with RFID transponders for unambiguous identification. The method includes displaying predetermined target identifiers that are transmitted by the control unit for the handling parts by means of the remote indicators; displaying actual identifiers that are retrieved from the RFID transponders for the handling parts by means of the remote indicators; comparing the respective actual identifiers of the handling parts with the corresponding target identifiers of the handling parts, and signaling a need to change a handling part if the actual identifier for this handling part deviates from the appropriate target identifier, or signaling a correctly used handling part if the actual identifier for this handling part corresponds to the respective target identifiers.

The modular design of the treatment machine allows for a changeover or upgrading, if required per module. The RFID (Radio Frequency IDentification) transponders have the advantage that the handling parts can easily be marked unambiguously. The RFID transponders need not to be supplied with energy at the handling part but can be energized by an electromagnetic alternating field that is emitted from the RFID reading devices. It shall be understood that the RFID reading devices are provided sufficiently close to the respective corresponding RFID transponders. Marking the handling parts means that they themselves are unambiguously identifiable and, beyond, also unambiguously identifiable in their environments. That means, that the one or those modules where these specific handling parts are used are also unambiguously identifiable. To do so, target identifiers can specify where which specific handling part is to be used in a module. Correspondingly, actual identifiers can specify which handling part is currently used in a module. Here, a relation between handling part and module can be established, respectively, thus minimizing the possibility of an erroneous insertion of a handling part into the module. The target identifiers can be compared with the actual identifiers and a possibly falsely-used handling part can be discovered and displayed, or the error can be signalized. Thus, it can be displayed easily whether or that a handling part needs to be exchanged. Similarly, it can be indicated that the handling part is correctly used, i.e. that the correct handling part is used in the correct module.

Displaying can be done by remote indicators. These indicators are those provided in the vicinity of the handling parts, but not necessarily provided directly to the handling parts. Displaying may either be done digitally or via appropriate monitors or touch screens.

According to the method, the target identifiers and the actual identifiers of the handling parts may each comprise a handling part number and a treatment module number so that a handling part can be assigned to a treatment module.

This allows specific allocation between a handling part and a module.

The target identifiers may comprise a target period for a handling part that specifies how long a handling part is to be used in a treatment module, and the actual identifiers may comprise an actual period for a handling part that specifies how long a handling part has already been used in a treatment module.

This enables a time-controlled changeover. For instance, handling parts can be replaced in a module of a treatment machine in accordance with a maintenance schedule after a predetermined period of time or a predetermined operating time.

According to the method, signaling of a required exchange of a handling part can be carried out if the actual period for a handling part is greater than the target period.

It goes without saying that tolerances can also be considered, for example, whether a target period regarding time or operating time has been exceeded by more than a predetermined tolerance.

The treatment modules may further comprise a plurality of changeover points, while the method may further comprise: displaying, by means of the remote indicators, required changeovers at the changeover points in width and/or height and/or angle, and successfully performed changeovers at said changeover points.

Changing or readjusting changeover points can also be done when there is a changeover of a treatment machine. For instance, widths and/or heights and/or angles can be readjusted. The current values required for the changeover, e.g. in absolute or relative units, may also be displayed by the remote indicators. Thus, both the changeover/adjustment at the changeover points of the treatment machine or its modules as well as the changeover/adjustment of handling parts of the treatment machine or its modules can be displayed in combination by means of the remote indicators, resulting in a coherent display and verification concept.

According to the method, the RFID reading devices can communicate with the remote indicators via a digital differential interface.

In this connection, the digital differential interface may include an RS-485 interface or a CANopen interface.

Thus, commonly used interface definitions can be used for communication. As a result, commercially available remote indicators are used within the scope of the method.

The method may further comprise transmitting the target identifiers for the handling parts from the control unit to the RFID reading devices.

The method may further comprise transmitting the actual identifiers transmitted by the control unit from the RFID reading devices to the remote indicators.

The method may further comprise transmitting the actual identifiers retrieved from the RFID transponders for handling parts from the RFID reading devices to the remote indicators.

Thus, the control unit may control both displaying the target identifiers and displaying the actual identifiers by means of the remote indicators. Communication takes place via the RFID reading devices. It is also possible that the remote indicators show the target identifiers and the actual identifiers simultaneously, for example digitally, and that a difference or deviation is indicated by means of the remote indicators. In doing so, the direction of the deviation with respect to the current value of the target identifier, e.g. up or down, can also be displayed.

According to the method, signaling a required exchange of a handling part may comprise a first optical signal, and signaling a correctly used handling part may comprise another optical signal which is different from the first optical signal.

The optical signal may be, for instance, a red light such as a red LED, to indicate a change, likewise a green light may indicate a correctly used handling part. Similarly, any changeovers can be displayed in this way at the changeover points.

The method may further comprise the step of displaying a sequence of handling parts to be exchanged and/or of the changeover points to be readjusted while monitoring the correct order by means of the control unit.

This enables a user of the treatment machine to be guided by readjusting the machine and replacing handling parts and/or changeover points. Thus, any incorrect changeovers can largely be avoided.

At least some of the remote indicators may be mobile or be combined with additional mobile indicators.

Thus, there is even more flexibility provided for the user, especially in case of handling parts that are poorly accessible—or if more than one user is to be involved in a changeover.

BRIEF DESCRIPTION OF THE DRAWINGS

In the following, embodiments of the disclosure are described with reference to the figures. The described embodiments are to be considered in all respects just as illustrative and not restrictive, and various combinations of the listed features are included in the disclosure.

In the drawings.

DETAILED DESCRIPTION

Figure 1:
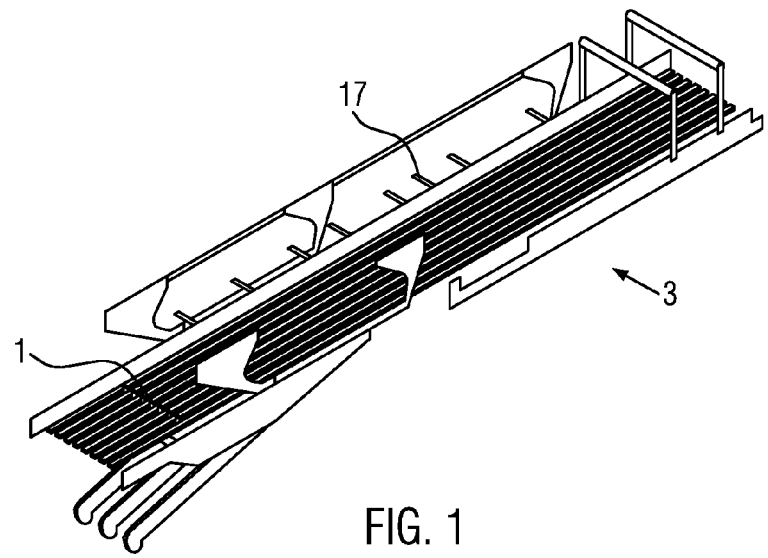
FIG. 1 is a schematic view of a module of the treatment machine.

FIG. 1 is a schematic view of a module in a treatment machine. This example shows an excerpt from a series machine. Just as an example, a handling part 1 is shown in the form of a graduation bar. A product stream may be grouped by means of graduation bars with several graduation fingers being arranged thereon (not shown). If the modules are to be adapted to different products and/or article sizes it may become necessary to have to replace the graduation bars in order to take specific grouping requirements into account. Thus, it may be necessary to replace one or more graduation bars by graduation bars of different shape, for example few thicker graduation bars. In this case there will be a change of the handling part. It is self-evident that usually more handling parts can be present in a module and that only a single handling part is shown for the shown example just for the sake of clarity.

Similarly, it may become necessary for the example shown in FIG. 1 to make an adjustment of guide members. FIG. 1 shows an example of a changeover point 17. In this example, a guide rail can be readjusted at changeover point 17, so that the width for the product stream can be adjusted. It is self-evident that usually more changeover points may be present in a module and that for the shown example only one changeover point 17 is shown just for the sake of clarity.

Figure 2:
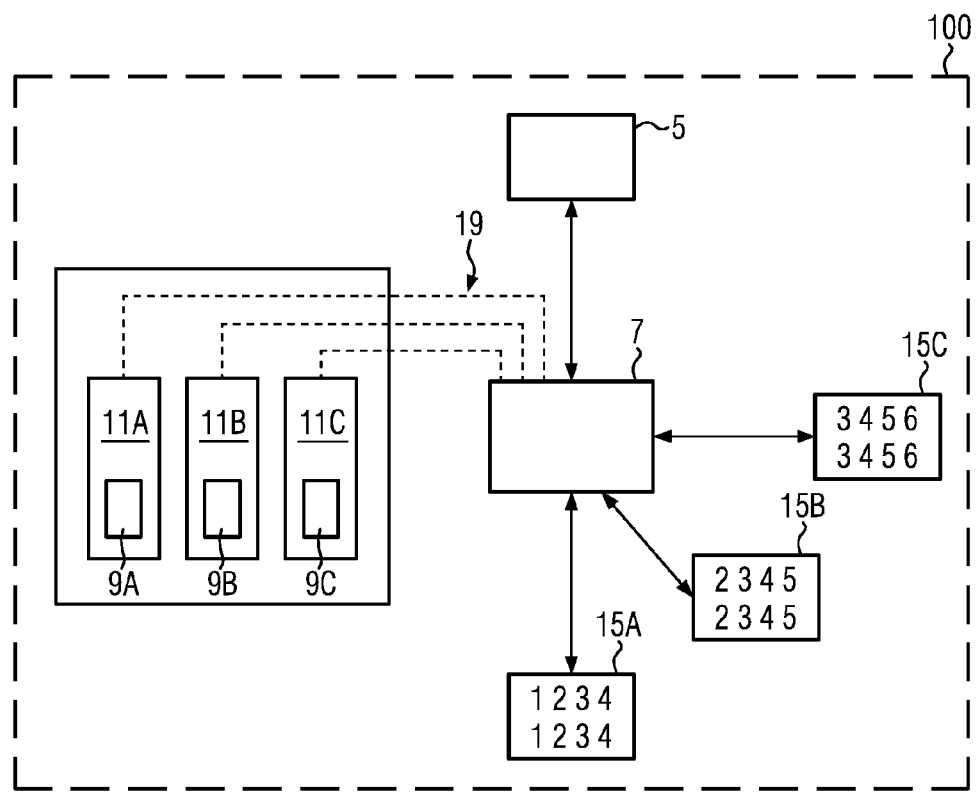
FIG. 2 is a schematic view of a treatment machine having a module and handling parts.

FIG. 2 is a schematic view of a treatment machine 100, e.g. for the treatment of containers such as bottles. The treatment machine 100 includes a treatment module 13. It is self-evident that the number of treatment modules may vary in a treatment machine and that only one treatment module 13 is merely exemplarily shown.

The treatment module 13 in FIG. 2 includes merely exemplarily three handling parts 11A, 11B and 11C. The handling parts 11A, 11B and 11C may be exchangeable. The handling parts 11A, 11B and 11C each are provided with RFID transponders 9A, 9B and 9C. The RFID transponders 9A, 9B and 9C are, for example, directly attached on or to the respective handling parts 11A, 11B and 11C. For example, each handling part 11A, 11B and 11C includes at least one RFID transponder 9A, 9B and 9C. Further RFID transponders may also be provided at certain predetermined locations in the module 13. Thus, an additional option, i.e. a higher level of security may be provided indicating that the correct handling part is placed in the correct module.

FIG. 2 further shows an RFID reading device (RFID reader) 7. It is self-evident that multiple RFID reading devices 7 may be provided that are assigned, for example to groups of RFID transponders 9A, 9B, 9C. The RFID reading devices 7 can emit an electromagnetic alternating field 19, indicated in FIG. 2 by dashed lines. This allows the RFID reading devices 7 to retrieve the RFID transponders 9A, 9B and 9C of the handling parts 11A, 11B. 11C. The RFID transponders 9A, 9B and 9C need not be energized separately, but can be supplied with energy by alternating field 19 emitted by said at least one RFID reading device 7. Thus, RFID reading device 7 can retrieve RFID transponders 9A, 9B and 9C and communicate with them.

FIG. 2 shows a control unit/control 5. This can be a computer with connected storage media (not shown). Control unit 5 may also be cross-linked in a network (not shown), in order to control, to check or to monitor a remote control of the treatment machine 100 or of the changeover of the treatment machine 100. Control 5 can communicate with the RFID reading devices 7, as is indicated by an arrow.

The RFID reading devices 7 may communicate with remote indicators 15A, 15B and 15C, as shown in FIG. 2. In this case, each remote indicator 15A, 15B and 15C can be assigned to a handling part 11A, 11B, 11C, or to an RFID transponder 9A, 9B, 9C that may be provided at a handling part 11A, 11B, 11C. An example for a possible remote indicator 15A, 15B, 15C is the remote indicator AP24 of the SIKO GmbH.

In FIG. 2, the remote indicators 15A, 15B and 15C merely exemplarily show digital numbers for identifying handling parts 11A, 11B, 11C. Such identification is shown in relation to FIG. 3. However, the display of the remote indicators 15A, 15B and 15C may also be designed differently than exemplarily shown in FIG. 2.

In particular, in FIG. 2 the RFID reading devices 7 can communicate with control unit 5. Control unit 5 can trigger the RFID reading devices 7 so as to communicate with RFID transponders 9A, 9B and 9C. A possible sequence is shown in FIG. 3.

Figure 3:
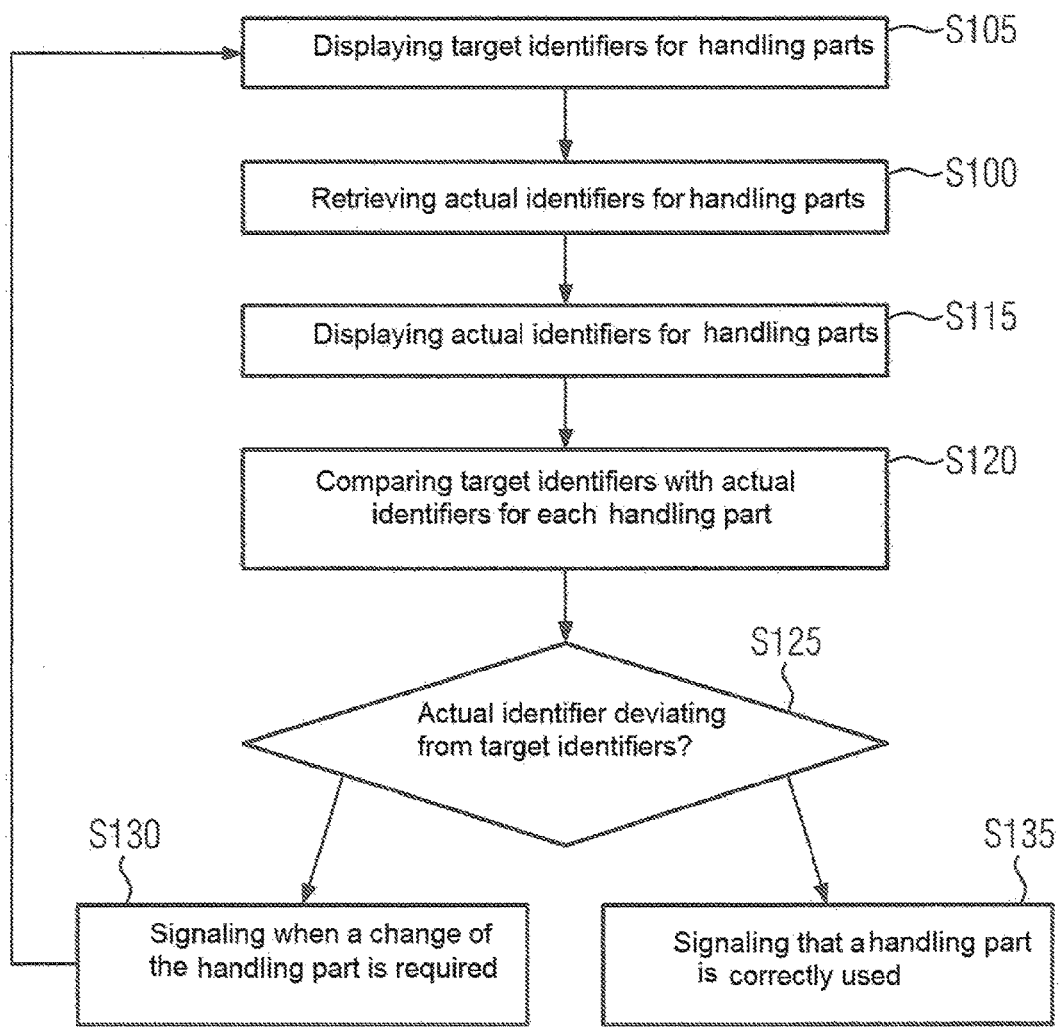
FIG. 3 is a schematic view of a method for the controlled changeover of a treatment machine.

FIG. 3 refers to a controlled changeover of a treatment machine, as shown, for example in FIG. 2. The controlled changeover may include the readjustment of changeover points, see, for example changeover point 17 in FIG. 1. The controlled changeover may also additionally or alternatively include the changeover of handling parts, especially the controlled exchange thereof. Thus, the same approach for changeover points and handling parts can be provided.

In FIG. 3, step S105, the target identifiers for handling parts 11A, 11B and 11C are displayed by means of remote indicators 15A, 15B and 15C. The target identifiers can be transmitted from control unit 5 to the one or more RFID reading devices 7. The transmission process can be controlled and particularly started by control unit 5. It is also possible that the RFID reading devices 7 retrieve some or all target identifiers from the control 5. The target identifiers can be transmitted from the RFID reading devices 7 to remote indicators 15A, 15B and 15C, where they are displayed, as schematically shown in FIG. 2. It is also possible that the control unit additionally directly communicates with remote indicators 15A, 15B and 15C.

The target identifiers identify the handling parts 11A, 11B, 11C in their environment. This allows each handling part 11A, 11B and 11C to be clearly defined. In other words, the handling part can thus be encoded. In addition, the target identifiers may indicate e.g. how the handling part behaves with regard to the environment in which it is used, in this case the treatment module 13. The target identifiers may further show how long a handling part is to be used.

The target identifiers can be opposed to the actual identifiers. In FIG. 3, step S110, the actual identifiers are retrieved by means of the RFID reading devices 7 from RFID transponders 9A, 9B and 9C. By means of the alternating field 19, the actual identifiers from RFID transponders 9A, 9B and 9C can be transmitted to the RFID reading devices 7. The RFID reading devices 7 can transmit the corresponding, received actual identifiers to the remote indicators 15A, 15B and 15C, respectively. There, the actual identifiers can be displayed. In particular, a comparison of target identifiers and actual identifiers may there already optically be carried out by a user, especially when both are displayed substantially simultaneously. In addition, the RFID reading devices 7 can transmit the actual identifiers to the control unit 5. According to step S120 in FIG. 3, an automatic comparison can be performed. Control unit 5 may in particular evaluate a discrepancy between the target identifiers and the actual identifiers according to step S125. Depending on the evaluation, steps S130 or S135 can be initiated. If the target identifiers deviate from the actual identifiers, step S130, a need for action may be signaled. In particular it can be signaled that there is an error with regard to a handling part, for example, an incorrect handling part has been used or the handling part 11A, 11B 11C is already being used for too long. Likewise, it can also be shown that handling part 11A, 11B, 11C has correctly been used. The result of the comparison may, in turn, be transmitted by control unit 5 via the one or more RFID reading devices 7 to remote indicators 15A, 15B and 15C. Thus, a changeover of the treatment machine can be performed automatically. Each changeover point to be converted and each handling part to be exchanged can be displayed by means of the same display concept. Displaying in sequence is possible, so that the user can practically hardly make mistakes in the order of the changeover. Signaling in step S130 can be done, for example by a red LED or a red light. In addition, the indicated values such as digital numbers may flash or are highlighted so that a required action can be clearly seen. Likewise, signaling in step S135 by a green LED or a green light can be done, so that confirmation can be seen that no action is required at this point for this handling part or that an action has been successfully completed, in particular an exchange.

The communication of remote indicators 15A, 15B, 15C with RFID reading devices 7 and/or the control unit may be performed by suitable digital interfaces. Thus, already existing displays can be easily integrated into the concept. For example, RS485 or CANopen interfaces can be used.

It is also possible, at least for some of the remote indicators 15A, 15B and 15C, to combine additional mobile displays with remote indicators 15A, 15B and 15C. It is also possible that some or all of the remote indicators 15A, 15B, 15C are mobile. Thus, there is greater flexibility for the user, especially in case of hardly accessible handling parts and/or changeover points.

In summary, by means of a consistently controlled changeover and/or specification of changeover cycles for the handling parts and/or the changeover points, there is great protection against false adjustments, false changeovers, false exchange, thus reducing loss of time and increasing the efficiency.

The invention claimed is:

1. A method for the controlled changeover of a treatment machine having a plurality of RFID reading devices, a control unit and one or more treatment modules, each treatment module having a plurality of remote indicators and one or more exchangeable handling parts for handling articles treated by the treatment machine, wherein the handling parts are provided with RFID-transponders for unambiguous identification, comprising:

transmitting, by the control unit, predetermined target identifiers for the handling parts, wherein each target identifier comprises a handing part number that uniquely identifies the target handling part and a treatment module number that uniquely identifies the treatment module to which the target handling part is assigned;

displaying, by means of remote indicators, the predetermined target identifiers transmitted by the control unit for the handling parts;

retrieving, by means of the RFID reading devices, actual identifiers for the handling parts, wherein each actual identifier comprises a handing part number that uniquely identifies the actual handling part and a treatment module number that uniquely identifies the treatment module to which the actual handling part is assigned;

displaying, by means of remote indicators, the actual identifiers retrieved from the RFID transponders by means of the RFID reading devices for the handling parts;

comparing the respective actual identifiers of the handling parts with the corresponding target identifiers of the handling parts, thereby obtaining a comparison result, determining whether a change of a handling part is required based on the comparison result, and signaling that a change of a handling part is required in case the determining indicates that for said handling part the actual identifier deviates from the corresponding target identifier and performing the changeover of the handling part, else signaling a handling part is correctly used in case the determining indicates that for said handling part the actual identifier matches with the corresponding target identifiers.

2. The method according to claim 1, and the target identifiers for a handling part further comprise a target period for a handling part indicating how long a handling part is to be used in a treatment module, and the actual identifiers for a handling part comprise an actual period indicating how long a handling part has already been used in a treatment module.

3. The method according to claim 2, and signaling a required exchange of a handling part occurs in case the actual period for a handling part is greater than the target period.

4. The method according to claim 1, and the treatment modules further comprise a plurality of changeover points, further comprising displaying, by means of remote indicators, the required changeovers at the changeover points in width and/or height and/or angle, and successful changeovers at the changeover points.

5. The method according to claim 1, and the RFID reading devices exchange data with the remote indicators via a digital differential interface.

6. The method according to claim 5, and the digital differential interface comprises an RS-485 interface or a CANopen interface.

7. The method according to claim 1, further comprising transmitting the target identifiers for the handling parts by means of the control unit to the RFID reading devices.

8. The method according to claim 1, further comprising transmitting the target identifiers transmitted by the control unit from the RFID reading devices to the remote indicators.

9. The method according to claim 1, further comprising transmitting the actual identifiers for the handling parts retrieved by the RFID transponders from the RFID reading devices to the remote indicators.

10. The method according to claim 1, and signaling a necessary exchange of a handling part includes a first optical signal, and signaling a correctly used handling part includes a second optical signal which is different from the first optical signal.

11. The method according to claim 10, further comprising displaying, by means of remote indicators, an order of handling parts to be exchanged and/or the changeover points to be changed while monitoring the correct sequence by means of the control unit.

12. The method according to claim 1, and at least some of the remote indicators are mobile or can be combined with additional mobile displays.

13. The method according to claim 1, and the treatment machine comprises a container treatment machine.

14. The method according to claim 1, wherein the comparing is performed automatically and/or the changeover of the treatment machine is performed automatically.

15. A method for the controlled changeover of a treatment machine having a plurality of RFID reading devices, a control unit and one or more treatment modules, each treatment module having a plurality of remote indicators and one or more exchangeable handling parts for handling articles treated by the treatment machine, wherein the handling parts are provided with RFID-transponders for unambiguous identification, comprising:

transmitting, by the control unit, predetermined target identifiers for the handling parts;

displaying, by means of remote indicators, the predetermined target identifiers transmitted by the control unit for the handling parts;

retrieving, by means of the RFID reading devices, actual identifiers for the handling parts;

displaying, by means of remote indicators, the actual identifiers retrieved from the RFID transponders by means of the RFID reading devices for the handling parts;

comparing the respective actual identifiers of the handling parts with the corresponding target identifiers of the handling parts, thereby obtaining a comparison result, determining whether a change of a handling part is required based on the comparison result, signaling that a change of a handling part is required in case the determining indicates that for said handling part the actual identifier deviates from the corresponding target identifier and performing the changeover of the handling part, else signaling a handling part is correctly used in case the determining indicates that for said handling part the actual identifier matches with the corresponding target identifiers; and displaying, by means of remote indicators, an order of handling parts to be exchanged and/or the changeover points to be changed while monitoring the correct sequence by means of the control unit.

16. The method according to claim 15, and the target identifiers and the actual identifiers of the handling parts each comprise a handling part number and a treatment module number so that a handling part can be assigned to a treatment module.

17. The method according to claim 15, and the target identifiers for a handling part further comprise a target period for a handling part indicating how long a handling part is to be used in a treatment module, and the actual identifiers for a handling part comprise an actual period indicating how long a handling part has already been used in a treatment module.

18. The method according to claim 17, and signaling a required exchange of a handling part occurs in case the actual period for a handling part is greater than the target period.

19. The method according to claim 15, and the treatment modules further comprise a plurality of changeover points, further comprising displaying, by means of remote indicators, the required changeovers at the changeover points in width and/or height and/or angle, and successful changeovers at the changeover points.

20. The method according to claim 15, and the RFID reading devices exchange data with the remote indicators via a digital differential interface.

21. The method according to claim 20, and the digital differential interface comprises an RS-485 interface or a CANopen interface.

22. The method according to claim 15, further comprising transmitting the target identifiers for the handling parts by means of the control unit to the RFID reading devices.

23. The method according to claim 15, further comprising transmitting the target identifiers transmitted by the control unit from the RFID reading devices to the remote indicators.

24. The method according to claim 15, further comprising transmitting the actual identifiers for the handling parts retrieved by the RFID transponders from the RFID reading devices to the remote indicators.

25. The method according to claim 15, and signaling a necessary exchange of a handling part includes a first optical signal, and signaling a correctly used handling part includes a second optical signal which is different from the first optical signal.

26. The method according to claim 15, and at least some of the remote indicators are mobile or can be combined with additional mobile displays.

27. The method according to claim 15, and the treatment machine comprises a container treatment machine.

28. The method according to claim 15, wherein the comparing is performed automatically and/or the changeover of the treatment machine is performed automatically.

\* \* \* \* \*